United States Patent
Nixon

[15] 3,679,134
[45] July 25, 1972

[54] WHEEL WASHING DEVICE

[72] Inventor: Charles D. Nixon, 1411 Wysong Drive, McKinney, Tex. 75069

[22] Filed: Nov. 9, 1970

[21] Appl. No.: 87,787

[52] U.S. Cl. .............................. 239/70, 134/45, 15/DIG. 2
[51] Int. Cl. .......................................................... B05b 15/06
[58] Field of Search ............... 239/61, 67, 70; 134/45, 123; 15/DIG. 2

[56] References Cited

UNITED STATES PATENTS

| 3,370,596 | 2/1968 | Daum et al. | 134/45 |
| 3,570,502 | 3/1971 | Farnsworth | 134/45 |
| 3,361,143 | 1/1968 | Daum et al. | 134/45 |
| 3,575,184 | 4/1971 | Jurkens | 134/45 |

Primary Examiner—M. Henson Wood, Jr.
Assistant Examiner—Michael Y. Mar
Attorney—Howard E. Moore and Gerald G. Crutsinger

[57] ABSTRACT

A vehicle washing device comprising wheel washing spray nozzles positioned at each side of the entrance of a wash bay in combination with a timer controlled valve adapted to divert all wash water from the vehicle washing apparatus to the wheel washing nozzles for a predetermined period of time and then back to the vehicle washing apparatus.

11 Claims, 7 Drawing Figures

INVENTOR
Charles D. Nixon

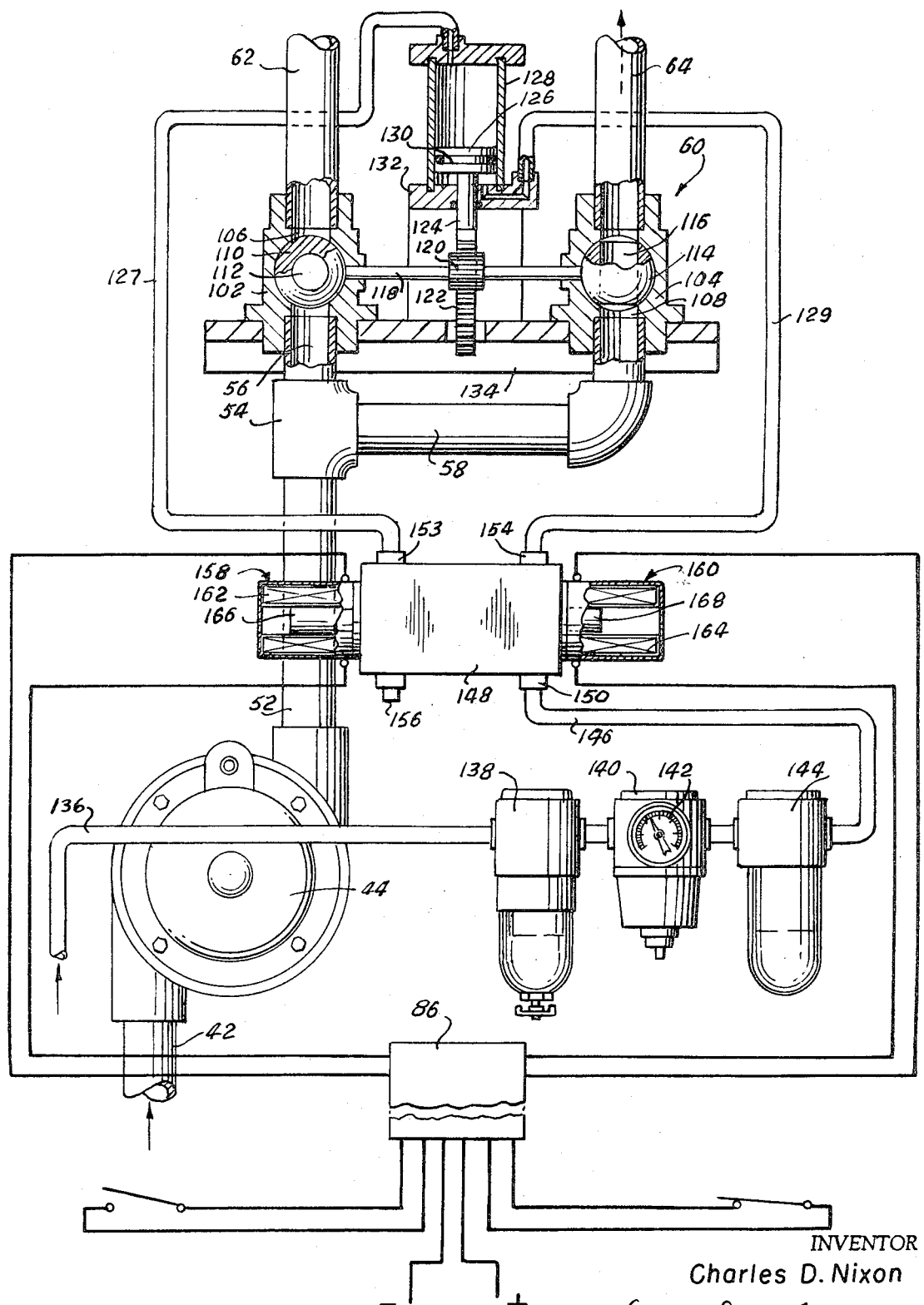
Fig. II
INVENTOR
Charles D. Nixon

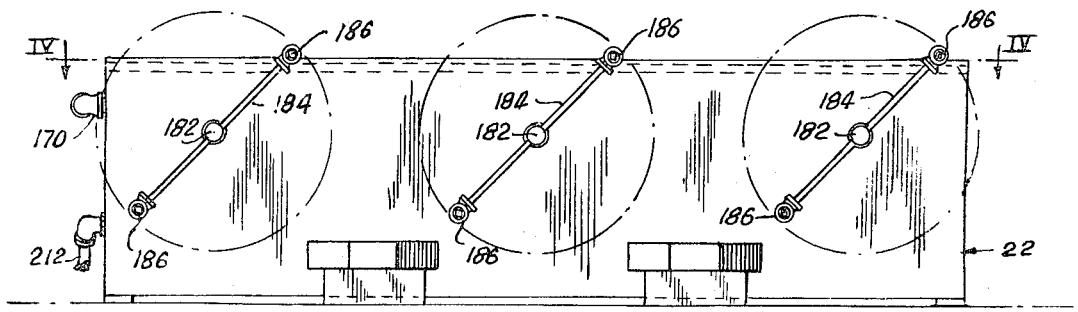
Fig. III
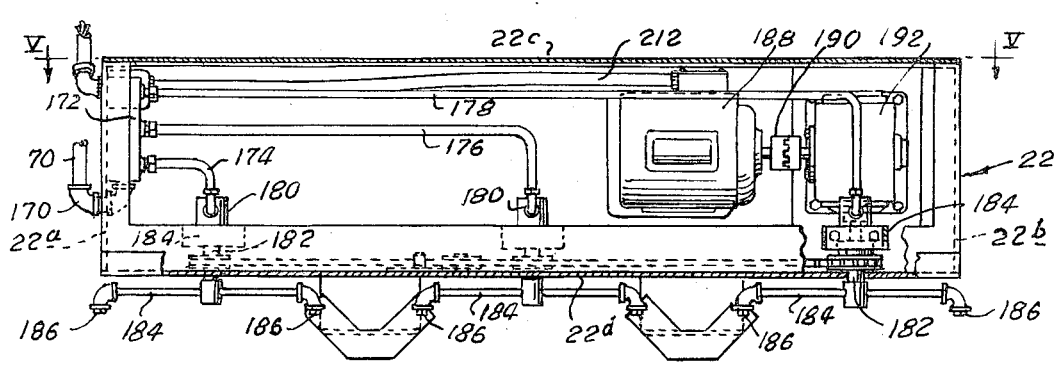
Fig. IV
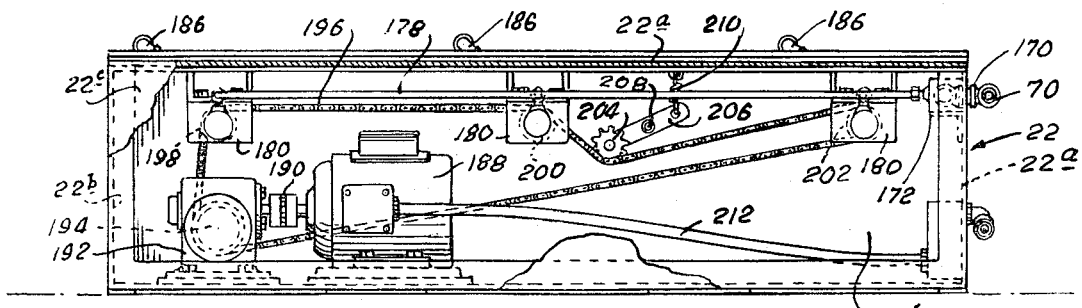
Fig. V
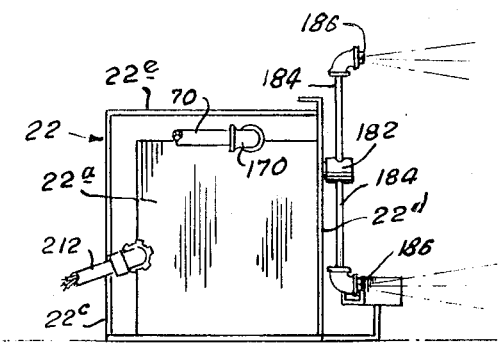
Fig. VI
INVENTOR
Charles D. Nixon
BY Howard E. Moor
Gerald G Crutsinger
ATTORNEYS

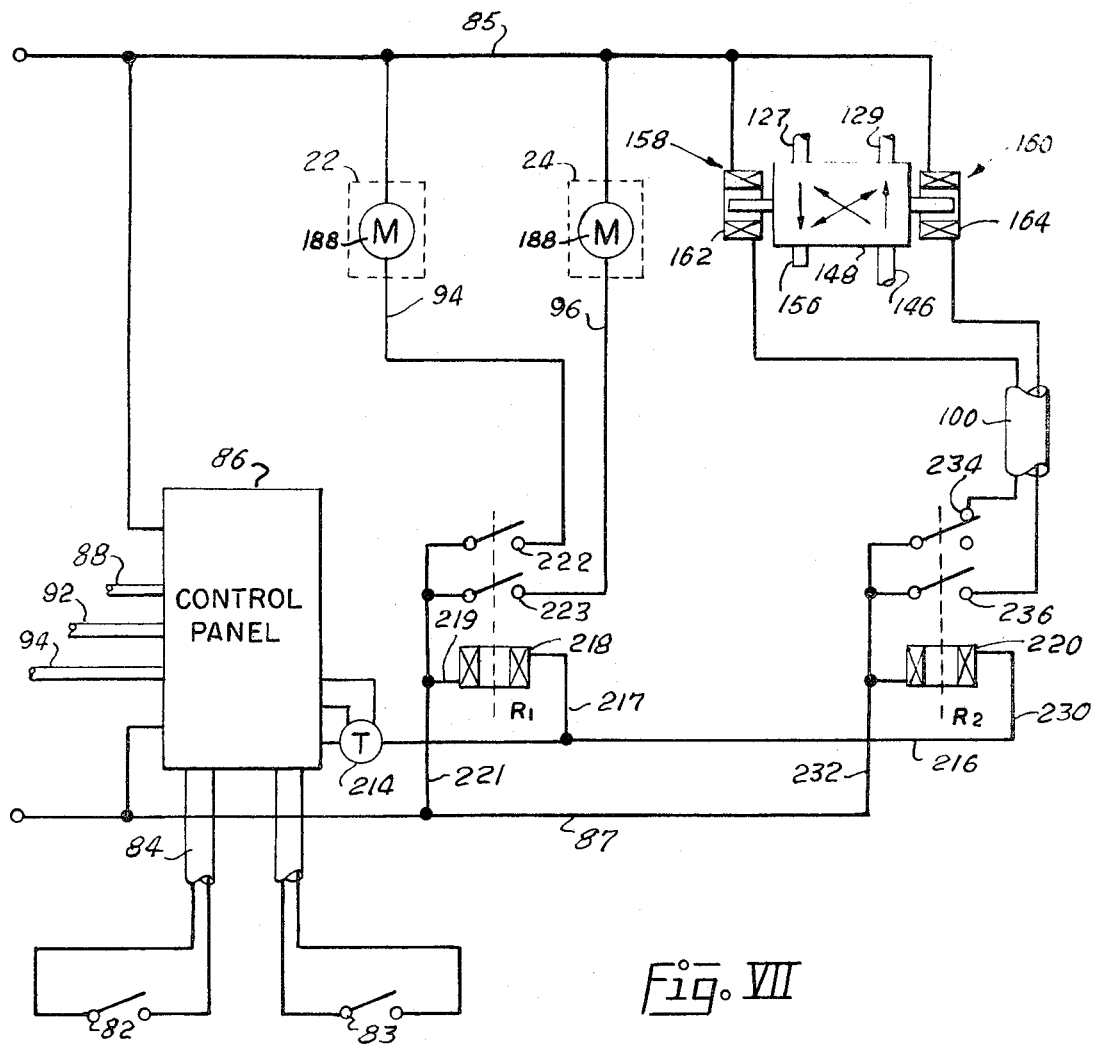
Fig. VII

WHEEL WASHING DEVICE

BACKGROUND OF THE INVENTION

Automatic vehicle washing apparatus heretofore developed have employed several types of nozzle and brush arrangements for washing wheels and side panels of a vehicle. However, no wheel washing apparatus heretofore employed has been inexpensive to construct and operate which would effectively clean wheels and side panels of all automobiles.

Both spinning and non-spinning brushes have been employed heretofore for washing wheels of a vehicle while the vehicle moves through a wash bay, while the vehicle is stationary, while the wheels of the vehicle are rotated by live rollers upon which the vehicle is supported, and while wheels of the vehicle are stationary. The brushes have been ineffective because of varying dimensions between wheels and varying body configurations of automobiles.

Spray nozzles heretofore employed to wash wheels have been inadequate because of insufficient volume of water, insufficient pressure and ineffective method of operation.

SUMMARY OF INVENTION

I have developed a wheel washing attachment for use in an automatic car wash bay which comprises spinning nozzles adjacent each side of the entrance of a wash bay. Suitable means, such as traveling or stationary nozzles or brushes within the wash bay, is employed for washing the body of the vehicle. I have developed a diverter valve which is particularly adapted to direct cleaning fluid, such as warm water having detergent mixed therewith, to the wheel washing apparatus for a predetermined period of time. The vehicle is driven through the wash bay past the wheel washing apparatus thereby washing the front wheels of the vehicle, side panels of the vehicle, and the rear wheels of the vehicle.

After the rear wheels of the vehicle have been washed the diverter valve is automatically energized to stop the flow of water to the wheel washing apparatus and to direct same to the apparatus for washing the body of the vehicle.

Since all of the water directed to the wash bay is delivered to the wheel washing apparatus, high pressures may be obtained with a relatively small capacity pump since the wheel washing apparatus and body washing apparatus are not fed simultaneously.

A primary object of the invention is to provide a wheel washing attachment for an automatic vehicle washing apparatus which is particularly adapted for installation in existing facilities without substantial modification thereof.

A further object of the invention is to provide a wheel washing apparatus adapted to utilize a relatively small capacity pump to effectively clean wheels and side panels of a vehicle.

A further object of the invention is to provide simplified control apparatus for diverting cleaning fluid from a wheel washing apparatus to a body washing apparatus.

A still further object of the invention is to provide a wheel washing apparatus which may be constructed economically while being of simple structure to minimize maintenance and downtime of a washing apparatus.

Other and further objects of the invention will become apparent upon referring to the detailed description hereinafter following and to the drawings annexed hereto.

DESCRIPTION OF THE DRAWING

Drawings of a preferred embodiment of the invention are annexed hereto so that the invention may be better and more fully understood, in which:

FIG. I is a diagrammatic perspective view of the wheel washing apparatus installed in a wash bay;

Figure 1:
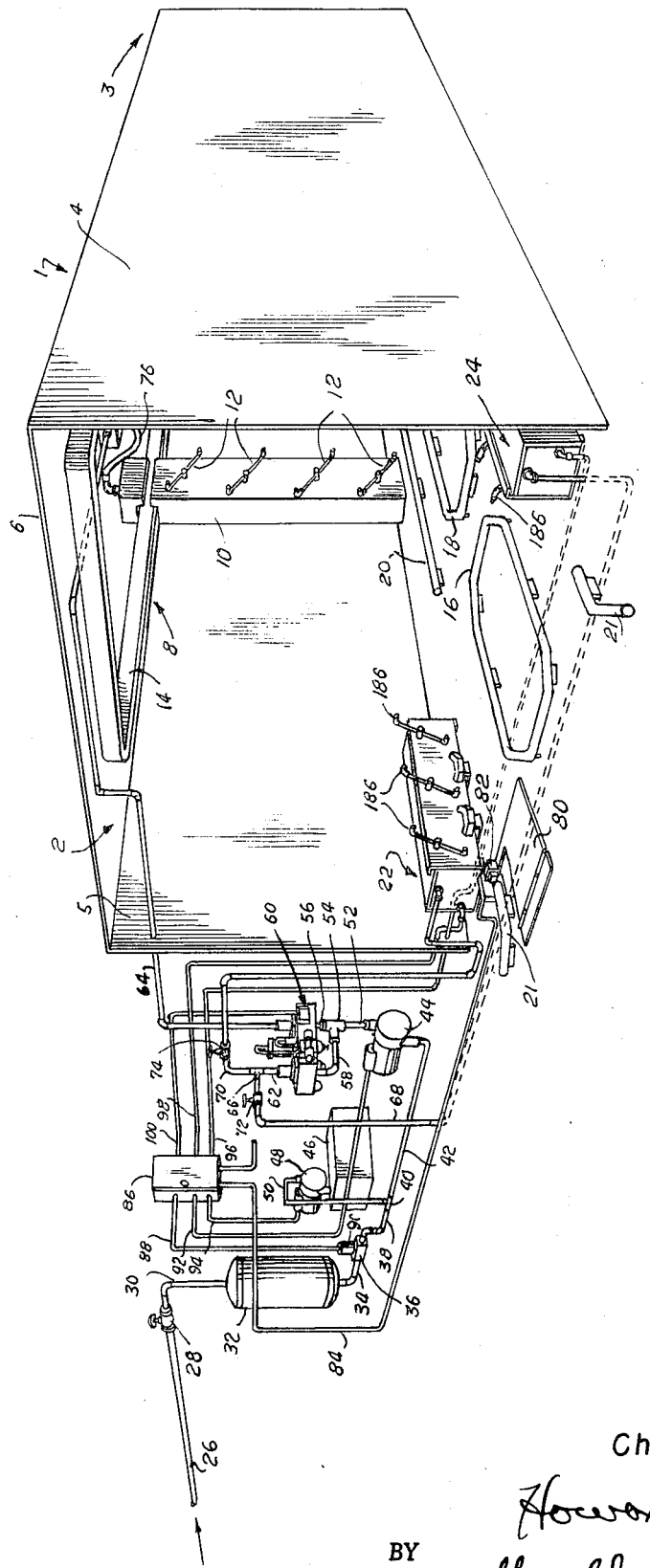

FIG. II is the cross sectional view through the diverter valve illustrating the control system therefor;

FIG. III is a side elevational view of a wheel wash apparatus;

FIG. IV is a cross sectional view taken substantially along line IV—IV of FIG. III;

FIG. V is a cross sectional view taken substantially along line V—V of FIG. IV;

FIG. VI is an end view of the wheel washing apparatus; and,

FIG. VII is a wiring diagram of the electrical control apparatus.

Numeral references are employed to designate like parts throughout the various figures of the drawing.

DESCRIPTION OF A PREFERRED EMBODIMENT

Referring to FIG. I of the drawing, numeral 1 generally designates a vehicle wash bay having an entrance end 2 and an exit end 3 comprising side walls 4 and 5, and a top 6.

The vehicle body washing apparatus, generally designated by numeral 8, may assume any desired configuration. However, in the particular embodiment of the invention illustrated in the drawing a carriage 10 having rotatable spinners 12 mounted thereon is adapted to move around track 14 to traverse a vehicle positioned in wash bay 1. Suitable center guide rails 16 and 18 and curb rails 20 and 21 are provided to assure positioning of the vehicle in a desired location within wash bay 1 as it is moved thereinto.

Wheel washers 22 and 24 are positioned adjacent the entrance end 2 of wash bay 1 to direct high velocity wash water to wheels and sides of the vehicle as the vehicle is moved inwardly toward the exit end 3 of bay 1 for positioning the vehicle relative to track 14.

Suitable means is provided for mixing and delivering water and detergent to spinners 12 and to wheel washing devices 22 and 24.

Supply line 26 is connected to a suitable source of water such as a municipal water supply and has an end connected through valve 28 and line 30 to an inlet opening of a heater 32. The outlet opening of heater 32 is connected through hot water line 34, valve 36, line 38, connector 40 and line 42 to the low pressure or intake side of main pump 44.

Detergent container 46 has a pipe therein connected to detergent injector pump 48 which has a detergent line 50 between the high pressure side thereof and connector 40.

The high pressure side of main pump 44 is connected through a line 52, tee 54 and lines 56 and 58 to inlet ports of a diverter valve generally designated by numeral 60 which will be hereinafter more fully described. Outlet ports of diverter valve 60 are connected through pipes 62 and 64 to wheel washing devices 22 and 24 and to body washing apparatus 8, respectively.

Line 62 is connected through tee 66 to lines 68 and 70 having control valves 72 and 74, respectively, mounted therein. Line 68 is connected to wheel washing apparatus 24 and line 70 is connected to wheel washing apparatus 22. It should be appreciated that valves 72 and 74 may be adjusted to balance flow of fluid to the wheel washing apparatus 22 and 24.

Line 64 is connected through suitable means such as flexible hose 76 to spinners 12 on carriage 10 of body washing apparatus 8.

A pressure pad 80 is positioned adjacent to the entrance end 2 wash bay 1 and is positioned to manipulate energizing switch 82 connected through electrical conduit 84 to control panel 86. Electrical conduit 88 leads from control panel 86 and is connected to a solenoid 90 to control warm water valve 36. Conduits 92 and 94 connect control panel 86 with main pump motor 44 and detergent pump 48, respectively. Conduits 96 and 98 are connected to wheel washing apparatus 22 and 24 respectively as hereinafter more fully explained. Conduit 100 is connected between control panel 86 and control means for diverter valve 60 as to be hereinafter more fully explained.

Referring to FIG. II of the drawing, diverter valve 60 comprises first and second valve body portions 102 and 104 having passages 106 and 108, respectively, extending therethrough.

First body portion 102 has a spherical valve member 110 rotatably disposed in passage 106 thereof, said valve member having a passage 112 extending therethrough.

Second body portion 104 has a spherical valve member 114 having a passage 116 therethrough rotatably disposed therein.

It should be noted that passage 112 in valve member 110 is disposed at an angle of 90° relative to passage 116 in valve member 114 such that when passage 116 is aligned with passage 108 the passage 112 is disposed transversely to and seals passage 106.

Valve members 110 and 114 are rigidly connected by a stem 118 having a gear 120 secured thereto.

Gear 120 is disposed in meshing relation with rack 122 on a rod 124 having a piston 126 secured to the end thereof. Piston 126 is slidably disposed in cylinder 128 and suitable means such as seal ring 130 is provided to prevent leakage of fluid between opposite sides of said piston.

Cylinder 128 is connected to suitable support means 132 which is in turn supported by member 134 connecting first and second body portions 102 and 104 of diverter valve 60.

Suitable means is provided for controlling movement of piston 126 through cylinder 128 which is preferably operated by controlled fluid pressure.

Conduit 136 is connected to a suitable source of pressurized fluid, such as an air compressor (not shown) and is connected through suitable control devices such as filter 138, pressure regulator 140 having a pressure gauge 142 thereon, and oiler 144 to conduit 146 connected to the inlet port of valve 148.

Valve 148 has an inlet port 150, outlet ports 152, 154, and an exhaust port 156. A valve member inside valve body 148 is adapted to be moved longitudinally therethrough for directing pressurized fluid selectively from inlet port 150 to outlet ports 152 and 154. When pressurized fluid is directed from inlet 150 to outlet port 152, port 154 is connected to exhaust port 156. When inlet port 150 is connected to port 154, port 152 is connected to exhaust port 156.

Solenoid devices 158 and 160 have coils 162 and 164, respectively, mounted therein for shifting the valve member in valve body 148. When coil 162 is energized core 166, secured to the end of the valve member, is moved to the left as viewed in FIG. II, causing inlet port 150 to be connected with outlet port 152 which is connected through line 127 to the upper end of cylinder 128 above piston 126 to urge said piston downwardly.

When coil 164 is energized core 168, secured to the end of the valve member, is urged to the right as viewed in FIG. II connecting inlet port 150 with outlet port 154 which is connected through line 129 to the lower end of cylinder 128, delivering fluid pressure to the lower face of piston 126, urging said piston upwardly.

It should be noted that when pressurized fluid is directed to cylinder 128 on one side of piston 126, the inside of the cylinder on the other side of said piston is vented through exhaust port 156 of valve 148.

Wheel washing devices 22 and 24 are of substantially identical construction and one of said devices is illustrated in FIGS. III–VI of the drawing. In the embodiment of the invention illustrated in the drawing, wheel washing device 22 comprises a hollow substantially rectangular box member having spaced end walls 22a and 22b, a back wall 22c, front wall 22d and a top 22e.

As best illustrated in FIGS. I and IV, line 70 directs detergent and water from diverter valve 60 to wheel wash device 22. The end of line 70 is connected to a suitable connector 170 which extends through an opening in the end wall 22a of wheel wash device 22 and is connected to a manifold 172 having a plurality of distribution lines 174, 176 and 178 connected thereto. Each distribution line 174, 176 and 178 is connected to a rotary joint 180 having a hollow rotatable shaft 182 journaled in bearings 184. Each hollow shaft 182 is connected through a plurality of tubes 184 to spray nozzles 186.

As best illustrated in FIGS. IV and V, each hollow shaft 182 of rotary joint 180 is rotated by positive drive means such as electric motor 188 having a powered shaft connected through clutch 190 in driving relation with gear box 192. Gear box 192 has a driven shaft with a sprocket 194 secured thereto for driving chain 196. Chain 196 is positioned in driving relation with sprockets 198, 200 and 202 drivingly secured to hollow shafts 182 of each rotary joint 180. An idler sprocket 204 is rotatably secured to one end of link 206 which is pivotally mounted at a central portion thereof on suitable pivot means such as pin 208.

The other side of link 206 has a spring 210 having one end secured thereto and the other end anchored to the front wall 22d. From the foregoing it should be readily apparent that when motor 188 is energized sprocket 184 will rotate chain 196 causing sprocket 196, 200, and 202 to rotate thereby positively rotating hollow shafts 182 and nozzles 186.

Motors 188 are connected through electrical conduits 96 and 98 to a control panel 86.

Referring to FIG. VII, control panel 86 comprises conventional control devices adapted for use with the wheel washing apparatus hereinbefore described. It is not deemed necessary to describe individual electrical connections and circuits of control panel 86 since the design may vary depending upon the specific configuration of the car washing apparatus. The modification of control panel 86 for controlling the wheel washing apparatus will be described in combination with a description of the operation thereof.

Control panel 86 is triggered or set when switch 82 at the entrance end 2 of wash bay 1 is manipulated as a wheel of the vehicle rolls across pressure plate 80. When switch 82 is manipulated current is directed through electrical conduit 88 to energize warm water solenoid 90, opening valve 36; current is directed through electrical conduit 92 to the main pump motor 44; current is directed through electrical conduit 94 to energize motor of detergent pump 48. This causes pressurized warm water having detergent mixed therein to be delivered through conduit 52 to diverter valve 60.

Manipulation of switch 82 causes timer 214 to be set, delivering a signal through line 216 for a predetermined period of time. The control system is connected through conductors 85 and 87 to a suitable source of electricity (not shown).

When a signal is delivered through line 216 coils 218 and 220 of relays R1 and R2 are energized.

Relay R1 has a coil 218 connected through line 217 to line 216 and through lines 219 and 221 to conductor 87. Relay R1 has normally open contacts 222 and 223 connected to conductors 94 and 96 which are connected through conduits 98 and 96 to motors 188 of wheel washing device 22 and 24 respectively. When coil 218 of relay R1 is energized, closing normally open contacts 222 and 223, a circuit is completed through conductor 87, line 221, lines 94 and 96 to conductor 85 causing nozzles 86 to rotate.

Relay R2 has the coil 220 and is connected through conductors 230 and 232 to conductors 216 and 87, respectively. Conductor 232 is connected to a normally closed contact 234 and a normally open contact 236 of relay R2. When coil 220 of relay R2 is not energized the current is directed from conductor 87 through conductor 232, normally closed contact 234, coil 162 of solenoid 158 to conductor 85. When solenoid 158 is energized fluid pressure is directed through line 127 to the upper end of cylinder 128 rotating valve members 110 and 114 to the position illustrated in FIG. II causing water and detergent to be delivered through line 64 to the carriage 10 of vehicle body washing apparatus 8.

When coil 220 of relay R2 is energized current is directed from conductor 87 through conductor 232, normally open contact 236, coil 164 of solenoid 160 to conductor 85. When normally open contact 236 is closed valve 148 is shifted to direct pressurized fluid through line 129 to the lower end of cylinder 128 causing water and detergent to be delivered through line 62 to nozzles 186 of wheel washing devices 22 and 24.

From the foregoing it should be readily apparent that when switch 82 is closed timer 214 is set causing motors 188 of wheel washing devices 22 and 24 to be energized and wash water is diverted from the body washing apparatus 8 for a predetermined period of time.

Switch 83 is positioned adjacent the exit end 3 of wash bay 1 and is connected to control panel 86 to override timer 214 thus de3energizing coils 218 and 220 of relays R1 and R2, respectively, when the wheel of a vehicle closes said switch. Thus the wheel washing devices 22 and 24 will be disconnected at the end of the predetermined time set by timer 214 or when the wheel of a vehicle closes the switch 83, whichever occurs first.

From the foregoing it should be readily apparent that I have developed a wheel washing device which directs all of the pressure of fluid moved through main pump 44 to desired points of use for washing wheels of a vehicle as well as side panels thereof. It should also be readily apparent that the wheel washing apparatus may be installed in a conventional automatic car wash apparatus by making minor modifications as to control panel 86 and by installing diverter valve 60 together with wheel wash apparatus 22 and 24.

As viewed in FIG. III, spray nozzles 186 are positioned to deliver high pressure fluid over a distance which is greater than one-half of the circumference of a vehicle tire thus assuring that all portions of the wheel will be thoroughly cleaned.

It should be appreciated that minor modifications may be made to the structure hereinbefore described without departing from the spirit and scope of my invention.

Having described my invention I claim:

1. In a vehicle washing device, first and second spray devices; first and second conduits connected to the first and second spray devices; first and second valve means in the respective conduits; closure means in the valve means positioned to close one of the valves when the other valve is open; means to connect the valves to a source of fluid; signal responsive actuating means connected to the valves; first switching means on one side of the first spray device to deliver a signal to trigger the actuating means to direct fluid to the first spray device; and second switching means on the other side of the first spray device to deliver a signal to trigger the actuating means to direct fluid to the second spray device.

2. The combination called for in claim 1 with the addition of timing means to trigger the actuating means to direct fluid to the second spray device at the end of a predetermined period of time after the actuating means has been triggered by the first switching means.

3. The combination called for in claim 1 wherein the first spray device comprises a spray nozzle movably secured to support means; and power transmission means to move the nozzle relative to the support means.

4. The combination called for in claim 3 wherein the power transmission means is adapted to rotate the nozzle about a fixed axis extending through the support means.

5. The combination called for in claim 1 wherein the said first spray device is adapted to spray over an area having a length greater than one-half of the circumference of a vehicle tire.

6. In a wheel washing device, means to wash wheels of a vehicle; means to wash the body of a vehicle; a source of cleaning fluid; conduit means between the source of cleaning fluid, the means to wash wheels, and the means to wash the vehicle body; a valve body having first and second flow passages communicating with the conduit means; closure means positioned to close one of said passages when the other of said passages is open to selectively direct cleaning fluid to the means to wash wheels or to the means to wash the vehicle body; current responsive actuating means to manipulate the closure means; and first and second switching means to trigger the actuating means.

7. The combination called for in claim 6 wherein the current responsive actuating means comprises fluid pressure actuated means; and with the addition of means to supply fluid pressure to the actuating means.

8. The combination called for in claim 6 wherein the current responsive actuating means comprises a pressure actuated cylinder having a piston slidably disposed therein, and a piston rod extendable from the cylinder; and with the addition of interengaging means between the piston rod and the closure means to move the closure means when the piston rod is moved to initiate flow to the means to wash the body of the vehicle while terminating the flow to the means to wash wheels; and means to supply pressurized fluid to the cylinder.

9. The combination called for in claim 6 with the addition of timing means to trigger the actuating means to direct fluid to the means to wash the body of the vehicle at the end of a predetermined time after the actuating means has been triggered by the first switching means.

10. In a vehicle washing device, means to wash wheels of a vehicle; means to wash the body of a vehicle; a source of cleaning fluid; conduit means between the source of cleaning fluid, the means to wash wheels, and the means to wash the vehicle body; first and second valve bodies communicating with the conduit means; a valve member in each of said valve bodies; a pressure actuated cylinder having a piston slidably disposed therein, and a piston rod extendable from the cylinder; interengaging means between the piston rod and the valve members to move the valve members simultaneously when the piston rod is moved to initiate flow to the means to wash the body of the vehicle while terminating flow to the means to wash wheels; and means to supply pressurized fluid to the cylinder.

11. The combination called for in claim 10 wherein the means to supply pressurized fluid comprises signal responsive means communicating with the inside of a cylinder on opposite sides of the piston; and means to deliver a signal to manipulate the signal responsive means.

* * * * *